(12) United States Patent
Nishida et al.

(10) Patent No.: US 9,073,157 B2
(45) Date of Patent: Jul. 7, 2015

(54) VERTICAL MACHINING CENTER

(71) Applicant: Yamazaki Mazak Corporation, Aichi Pref. (JP)

(72) Inventors: Kiyoshi Nishida, Aichi Pref. (JP);
Takeshi Suzuki, Aichi Pref. (JP);
Yunosuke Hirose, Aichi Pref. (JP);
Yasuhiro Sakai, Aichi Pref. (JP)

(73) Assignee: Yamazaki Mazak Corporation, Aichi Pref. (JP)

( * ) Notice: Subject to any disclaimer, the term of this patent is extended or adjusted under 35 U.S.C. 154(b) by 0 days.

(21) Appl. No.: 14/494,184

(22) Filed: Sep. 23, 2014

(65) Prior Publication Data

US 2015/0016914 A1   Jan. 15, 2015

Related U.S. Application Data

(63) Continuation of application No. PCT/JP2012/070547, filed on Aug. 10, 2012.

(51) Int. Cl.
*B23Q 1/66*   (2006.01)
*B23Q 11/08*  (2006.01)
*B23Q 7/14*   (2006.01)
*B23Q 7/02*   (2006.01)

(52) U.S. Cl.
CPC .......... *B23Q 7/1431* (2013.01); *Y10T 29/5196* (2015.01); *Y10T 409/30392* (2015.01); *B23Q 1/66* (2013.01); *B23Q 11/0891* (2013.01); *Y10T 409/306104* (2015.01)

(58) Field of Classification Search
CPC ............. Y10T 409/30532; Y10T 409/305432; Y10T 409/306048; Y10T 409/306104; Y10T 29/5196; Y10T 29/5124; Y10T 483/16; Y10T 483/165; Y10T 409/30392; B23Q 1/66

USPC .......... 409/159, 161, 172, 173, 134; 29/33 P, 29/563; 198/345.3, 346.1; 483/14–15
See application file for complete search history.

(56) References Cited

U.S. PATENT DOCUMENTS 4,673,076 A   6/1987  Mattson
5,265,497 A *  11/1993 Curless .......................... 29/33 P
(Continued)

FOREIGN PATENT DOCUMENTS

JP    58-109247 A   6/1983
JP    61-65747 A    4/1986
(Continued)

OTHER PUBLICATIONS

Machine Translation of JP 2007-152506, which JP '502 was published Jun. 2007.*
(Continued)

*Primary Examiner* — Erica E Cadugan
(74) *Attorney, Agent, or Firm* — Marsh Fischmann & Breyfogle LLP (57) ABSTRACT

A vertical machining center includes a machining table on which a first pallet is placed and which moves in an X axis direction. A spindle head includes a spindle and moves in a Z axis direction. A rotary pallet exchanger exchanges the first pallet with a second pallet in a setup area. In a pallet rotational movement area, the first and second pallets are rotated. An oil pan is below the second pallet in the setup area, accommodates a part of the pallet rotational movement area, and includes a cutout portion. Space exposed to the cutout portion forms a cutout area. A door partitions a machining area from the setup area. An amount of offset in the X axis direction from the axial center of the spindle to the rotational center of the pallet exchanger is equal to or less than a width of the first pallet.

16 Claims, 7 Drawing Sheets

(56) References Cited

U.S. PATENT DOCUMENTS

| | | | |
|---|---|---|---|
| 5,342,156 A * | 8/1994 | Baba | 409/134 |
| 5,622,247 A * | 4/1997 | Yamada | 198/346.1 |
| 6,082,939 A * | 7/2000 | Nakashima et al. | 409/134 |
| 6,513,640 B2 * | 2/2003 | Nishii | 198/346.1 |
| 6,851,542 B2 * | 2/2005 | Bernhard et al. | 198/346.1 |
| 8,656,576 B2 * | 2/2014 | Hobel | 29/563 |
| 2012/0255833 A1 * | 10/2012 | Ryu | 198/465.1 |

FOREIGN PATENT DOCUMENTS

| | | | |
|---|---|---|---|
| JP | 02-185341 A | | 7/1990 |
| JP | 05-53835 U | | 7/1993 |
| JP | 6-27028 U | | 4/1994 |
| JP | 2001-170839 A | | 6/2001 |
| JP | 2001-232535 A | | 8/2001 |
| JP | 2003-340673 A | | 12/2003 |
| JP | 2007-152506 A | * | 6/2007 |

OTHER PUBLICATIONS

English Translation of International Preliminary Report on Patentability for PCT Application No. PCT/JP2012/070547, 4 pages, (Feb. 10, 2015).

International Search Report dated Oct. 2, 2012, PCT Application No. PCT/JP2012/070547 filed Aug. 10, 2012, 2 pages.

* cited by examiner

VERTICAL MACHINING CENTER

CROSS-REFERENCE TO RELATED APPLICATIONS

The present application claims priority as a continuation application of International Application No. PCT/JP2012/070547, filed Aug. 10, 2012. The contents of International Application No. PCT/JP2012/070547 are incorporated herein by reference in their entirety.

BACKGROUND OF THE INVENTION

1. Field of the Invention

The present invention relates to a vertical machining center.

2. Discussion of the Background

Japanese Laid-open Patent Publication No. 2001-170839, Japanese Laid-open Patent Publication No. 2003-340673 and Japanese Laid-open Utility Model Publication No. 05-53835 (Japanese Utility Model Registration No. 2548646) disclose techniques related to machining centers provided with rotary pallet exchangers.

The pallet exchanger recited in Japanese Laid-open Patent Publication No. 2001-170839 includes bearing-equipped pallet holding stands arranged in a circumferential direction, and a drive shaft that rotates pallets. The rotation shaft rotates a pallet that is being rolled over on the bearing to exchange the pallet. That is, the bearing receives the load of the pallet, which includes the load of a workpiece, and this minimizes the rotational driving force of the pallet exchanger. It is noted that a member above the drive shaft is provided with a partition cover to partition the machining space and the workpiece exchange space from one another. During pallet exchange, the partition cover makes a 180-degree reverse rotation together with the drive shaft, ending up with the front and rear surfaces of the partition cover being arranged in inverse.

Japanese Laid-open Patent Application Publication No. 2003-340673 discloses a pallet exchanger of a horizontal machining center in which a table is movable in a Z axis direction. The pallet exchanger includes a rotation unit that includes a rotation shaft and a pair of arms. The rotation shaft is driven by a driving source. The pair of arms is coupled to the rotation shaft and forms point symmetry relative to the rotation shaft. The rotation shaft, that is, the rotational center of the arms, is offset in an X axis direction relative to a center line of the table. In this configuration, a work door located on a side surface of the machine is closer to the table, and the length of the machine in the Z axis direction is shortened.

In Japanese Laid-open Utility Model Application Publication No. 05-53835, a movement operation command switch on an operation panel is operated to: make a cylinder release a positioning pin that is fixing the pallet exchanger to the bed; couple the pallet exchanger to a saddle; and move the saddle to move the pallet exchanger to a withholding position along a track located on the front of the bed. An area of space accessible by the operator is formed in front of the machine, and the operator stays in the space to perform operations including handling the tool mounted on the spindle.

SUMMARY OF THE INVENTION

According to one aspect of the present invention, a vertical machining center has an X axis direction, a Y axis direction, and a Z axis direction, and includes a machining table, a spindle head, a splash guard, a rotary pallet exchanger, a pallet rotational movement area, an oil pan, and a partition door. On the machining table, a first pallet is to be placed. The machining table is configured to move in the X axis direction. The spindle head includes a spindle on which a tool is to be mounted, and is configured to move in the Z axis direction relative to the machining table. The splash guard covers a machining area of the vertical machining center. The rotary pallet exchanger is configured to exchange the first pallet placed on the machining table with a second pallet placed in a setup area of the pallet exchanger. In the pallet rotational movement area, the first pallet and the second pallet are to be rotated. The oil pan is below the second pallet placed in the setup area of the pallet exchanger, and accommodates at least a part of the pallet rotational movement area located outside the splash guard on a machine front. The oil pan includes a cutout portion on one end of the oil pan. An area of space exposed to the cutout portion forms a cutout area. The partition door is configured to open and close to partition the machining area and the setup area from one another. The openable-closable cover is configured to open and close the setup area. An amount of offset in the X axis direction from the axial center of the spindle of the spindle head to the rotational center of the pallet exchanger is equal to or less than a width of the first pallet.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE EMBODIMENTS

1. A Configuration of the Embodiment

A vertical machining center according to an embodiment of the present invention will be described below by referring to FIGS. 1 to 9. In the following description, the right and left as viewed from a front direction F toward a vertical machining center 10 are respectively intended as the right and left of the vertical machining center 10. Also, the front side of the vertical machining center 10 is intended as "front", and the rear side of the vertical machining center 10 is intended as "rear".

Figure 1:
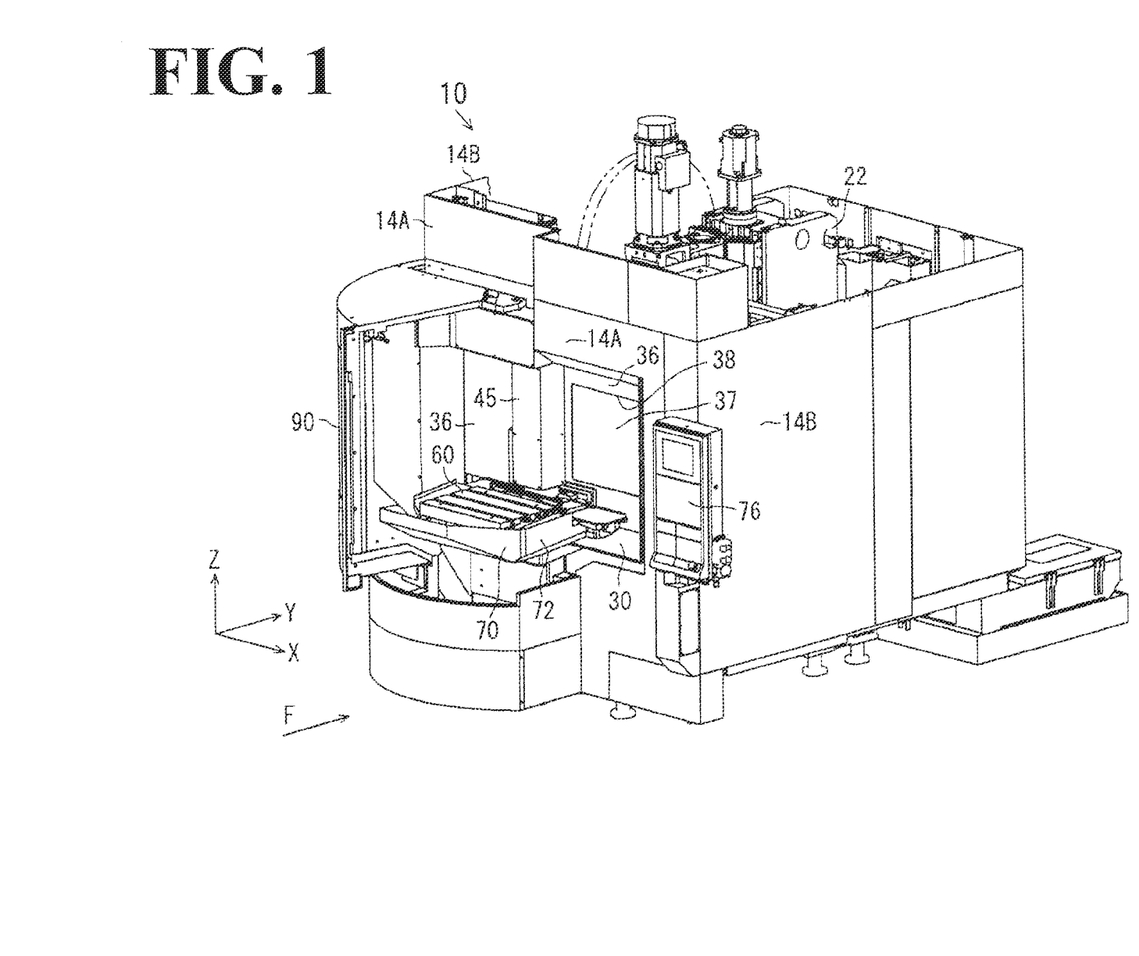
FIG. 1 is a schematic perspective view of a vertical machining center according to one embodiment.
Figure 2:
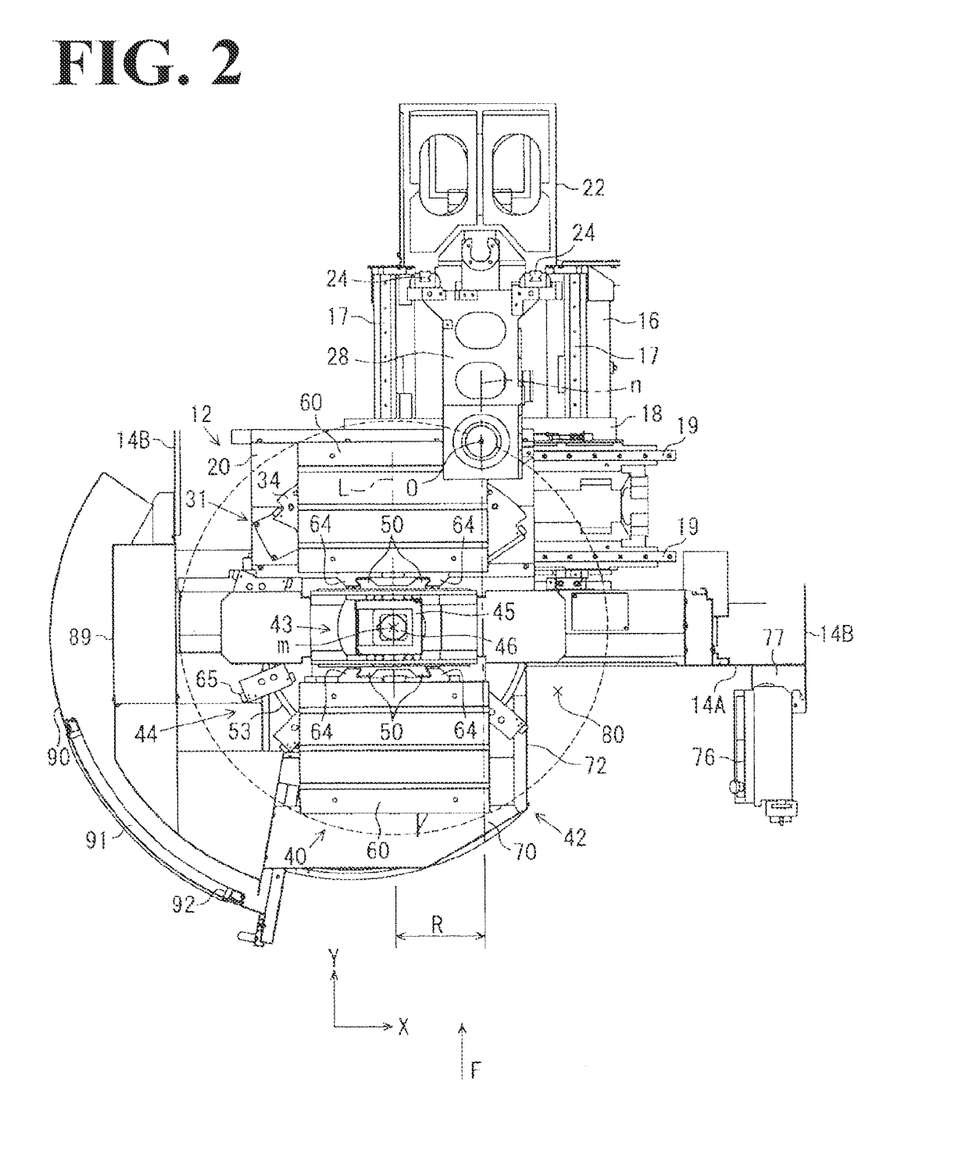
FIG. 2 is a plan view of a pallet exchanger with an openable-closable cover open.

As shown in FIGS. 1 and 2, the vertical machining center 10 includes splash guards 14A and 14B, which surround the front, right, and left sides of the machine. A front area of the surrounded space of the machine is a machining area 12, as shown in FIG. 5.

Figure 5:
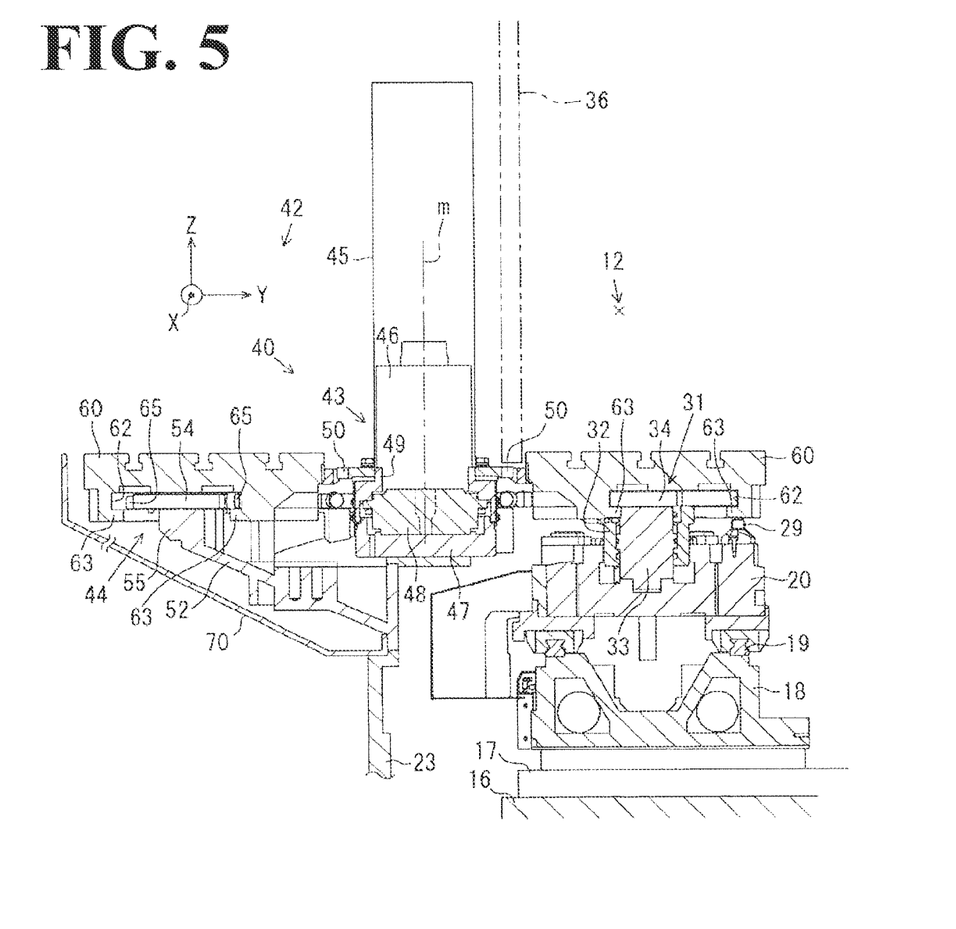
FIG. 5 is a cross-sectional view of the pallet exchanger.

As shown in FIGS. 2 and 5, the vertical machining center 10 includes a saddle 18 and a machining table 20. The saddle 18 moves on a Y axis track 17, which is located on a bed 16, in a Y axis direction, which is a front-rear machine direction. The machining table 20 moves on an X axis track 19, which is located on the saddle 18, in an X axis direction, which is a right-left machine direction. The machining table 20 moves in the X axis direction and the Y axis direction respectively by an X-axis drive motor and a Y-axis drive motor, not shown. On the machining table 20, a pallet 60 bearing a workpiece is to be placed.

On the bed 16, a column 22 is located. The column 22 is integral with the bed 16. In front of the column 22, a Z axis track 24 is located. On the Z axis track 24, a spindle head 28 is located. The spindle head 28 moves in a Z axis direction, which is an upward-downward direction, and has a spindle, not shown. In FIG. 2, O indicates an axial center of the spindle, and n indicates a line parallel to a Y axis and passing through the axial center O of the spindle and will be hereinafter referred to as "spindle base line n".

As shown in FIG. 2, the machining table 20 has a pallet exchange position that is offset in the X axis direction from the axial center O of the spindle by a predetermined amount R of offset.

In this embodiment, the predetermined amount R of offset is half the width of the pallet 60. It is noted that the width of the pallet 60 is the right-left direction length, that is, the X-axis direction length, of the pallet 60 in FIG. 2. It is also noted that the amount R of offset will not be limited to a value that is half the width of the pallet. Still, the amount R of offset is preferably equivalent to a length that is equal to or less than half the above-described width. In excess of the half value of the width, although the length in the right-left direction of the operator area including a cutout area 80, described later, increases, the machine width of the vertical machining center increases.

Figure 3:
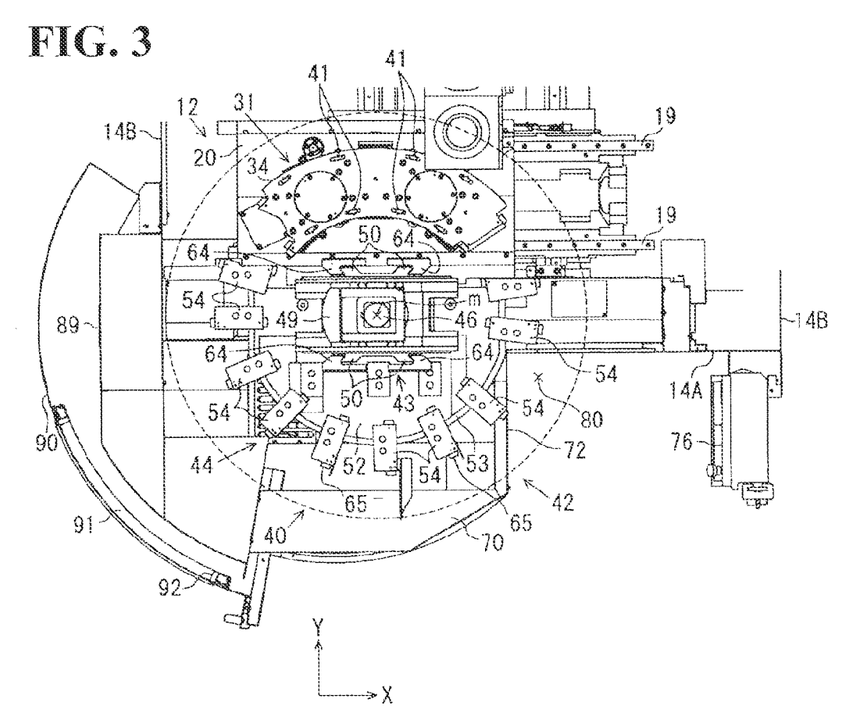
FIG. 3 is a plan view of the pallet exchanger with pallets omitted.

As shown in FIG. 3, a clamp device 31 is located on the machining table 20. As shown in FIG. 5, the clamp device 31 includes a cylinder 32, a circular-arc clamp plate 34, and a positioning pin 29. The cylinder 32 is located on the machining table 20. The clamp plate 34 is lifted upward and downward by a piston rod 33 of the cylinder 32. The positioning pin 29 accurately positions the pallet 60 when the pallet 60 is clamped onto the machining table 20. The clamp plate 34 has four rollers 41 on the inner circumferential side of the upper surface of the circular arc shape of the clamp plate 34, and also has four rollers 41 on the outer circumferential side of the upper surface of the circular arc shape of the clamp plate 34. Each of the rollers 41 is buried in the upper surface with the rolling surface exposed, and the clamp plate 34 is freely fitted and rollable in an engagement groove 62, which is elongate in a circular-arc shape in the width direction on the lower surface of the pallet 60. Then, when the piston rod 33 of the cylinder 32 moves downward, the clamp plate 34 and the machining table 20 hold between them a pair of protruded rims 63, thereby clamping the pallet 60 onto the machining table 20. The protruded rims 63 are opposed to one another and protrude from lower portions of the inner circumferential side and the outer circumferential side of the engagement groove 62 of the pallet 60. It is noted that the positioning pin 29 is fitted into a predetermined engagement hole (not shown) of the pallet 60 immediately before the pallet 60 is clamped. When the piston rod 33 moves upward, the pallet 60 is unclamped.

When the machining table 20 is positioned at the pallet exchange position, the circular-arc clamp plate 34 and guide members 54 of a setup table 52, described later, are on the same circumference. When the pallet 60 is unclamped from the machining table 20, the clamp plate 34 is lifted upward in conjunction with the upward movement of the piston rod 33 of the cylinder 32. This makes the upper surfaces of the rollers 41 on the clamp plate 34 flush with the upper surfaces of rollers 65, described later, of the guide members 54 on the setup table 52, enabling the pallet 60 to make a rotational movement.

While in this embodiment rollers have been exemplified as the guide mechanism, the guide mechanism is not necessarily cylindrical rollers; a spherical shape is also possible. It is also possible to use a sliding contact member insofar as the clamp plate 34 movably supports the ceiling surface of the engagement groove 62, which is on the lower surface of the pallet 60.

Figure 9:
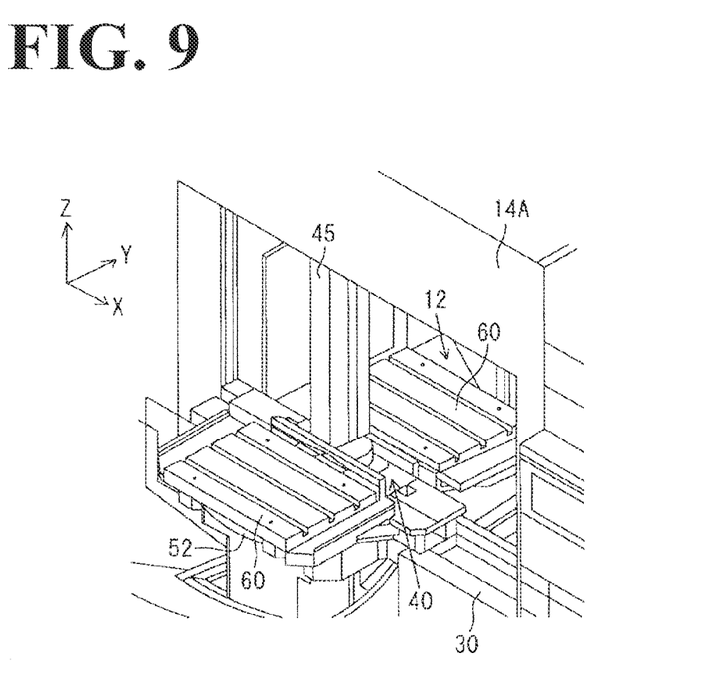
FIG. 9 is a perspective view of main elements of the vertical machining center with the partition door open.

As shown in FIG. 9, an opening 30 is formed on the splash guard 14A, which is a front wall, that is, a forward-side wall, of the vertical machining center 10. The opening 30 has a lower portion that is at or higher than the height of the waist of a person, and as a whole, the opening 30 has an approximately square shape.

Figure 4:
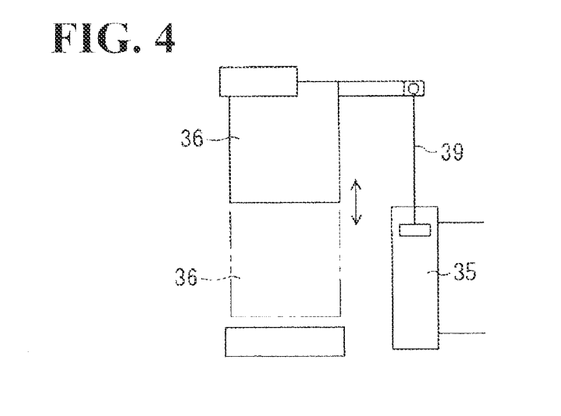
FIG. 4 is a drive circuit diagram of a partition door.
Figure 8:
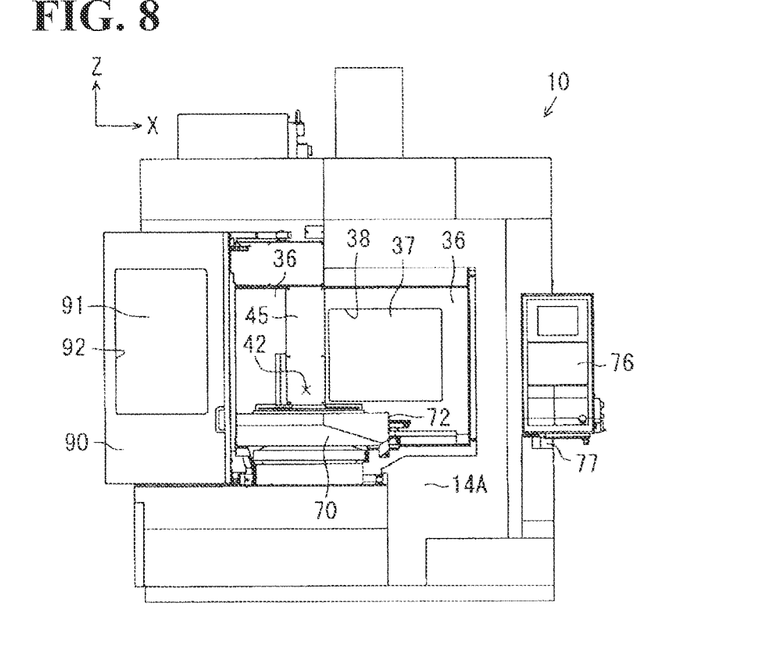
FIG. 8 is a front view of the vertical machining center with the openable-closable cover open.

As shown in FIGS. 1, 5, and 8, at the opening 30, a partition door 36 is supported in a slidable manner in the upward-downward directions to partition the machining area 12 and a setup area 42 from one another. For example, a solenoid valve, not shown, capable of three-way positioning, namely, open position, closed position, and intermediate position is used. Specifically, when the solenoid valve is given an open command and takes its open position, the partition door 36 is driven by a piston rod 39 of a pneumatic or hydraulic cylinder 35 as shown in FIG. 4 and moved into open position, where the opening 30 is opened. When the solenoid valve is given a close command and takes its closed position, the partition door 36 is driven by the piston rod 39 of the pneumatic or hydraulic cylinder 35 shown in FIG. 4 and moved into closed position, where the opening 30 is closed. It is noted that when the partition door 36 is at its open position or closed position, position detection switches, not shown, are activated to respectively output an open state signal and a closed state signal to a controller, not shown.

While in this embodiment the partition door 36 has been illustrated as being slidable in the upward-downward directions, the partition door 36 may be slidable in a right-left direction. The partition door 36 may also be wound up.

The partition door 36 is provided with a window 38 through which the machining area 12 is viewable. The window 38 is fitted with a transparent plate 37. In this embodiment, the window 38 is located in an area on the partition door 36 that makes the machining area 12 viewable, that is, an area that enables the operator to see the spindle machining a workpiece, when the operator has access to the cutout area 80, described later, which is the operator area. In this embodiment, the window 38 is located on an area of the partition door 36 that is at the right side relative to a cover 45. It is noted that the window 38 may be located approximately over the entire area on the partition door 36. It is noted that the operator area is an area to which the operator is accessible, that is, an area that the operator can enter, and the operator area includes the cutout area 80 when an openable-closable cover 90, described later, is open.

Next, the setup area 42 will be described.

As shown in FIG. 2, the setup area 42 is located at a position further forward than the front of the vertical machining center 10. As shown in FIGS. 2 and 5, the setup area 42 is an area of space defined by a cover wall 89, described later, the openable-closable cover 90 in closed state, and the partition door 36 at its closed position. The setup area 42 is an area of space where the operator or some other person performs a setup operation.

The setup area 42 communicates with the machining area 12 through the opening 30. As shown in FIG. 5, in the setup area 42, the setup table 52 is supported by a lower support member 23 at a position that has a 180-degree phase difference from the machining table 20 at the pallet exchange position.

As shown in FIGS. 2 and 5, under the setup table 52, an oil pan 70 is supported by the lower support member 23. The oil pan 70 accommodates at least a part of a pallet rotational movement area located outside the splash guard 14A on the machine front. For this purpose, as shown in FIGS. 2 and 3, the front area of the oil pan 70 is larger than the setup table 52, and the oil pan 70 covers a lower part of the setup table 52. This ensures that the oil pan 70 collects chips and attached cutting fluid resulting from cutting when they drop from the pallet 60 or the workpiece during rotation associated with pallet exchange or after completion of the pallet exchange. It is noted that for the convenience of illustration, the oil pan 70 is not shown in FIG. 9.

As shown in FIGS. 2 and 5, in the vertical machining center 10, the oil pan 70 has a cutout portion 72. The cutout portion 72 is formed by cutting one end of the oil pan 70 that is closer in the X axis direction to the axial center of the spindle, that is, closer to the spindle base line n (which is a line parallel to the Y axis and passing through the axial center of the spindle) than the other end of the oil pan 70 is to the spindle base line n. Specifically, the cutout portion 72 is formed by cutting the one end of the oil pan 70 closer to the spindle base line n on a line parallel to the spindle base line n. By providing the cutout portion 72, the cutout area 80 is formed and exposed to the cutout portion 72 and the splash guard 14A. When the openable-closable cover 90 is open, the cutout area 80 serves as an area of space through which the operator has access to the spindle, the workpiece placed on the pallet at the machining area side, and the pallet at the setup area 42 side.

Next, a pallet exchanger 40 will be described.

As shown in FIG. 5, the pallet exchanger 40 is a rotary device that includes a rotary drive unit 43 and a guide mechanism 44 located at the setup area 42 side.

The rotary drive unit 43 is located at a lower portion of the opening 30, which is a boundary area between the setup area 42 and the machining area 12. As shown in FIG. 2, the rotary drive unit 43 has its rotational center located at a position through which a center line L in the width direction of the pallet 60 passes when the machining table 20 is positioned at the pallet exchange position.

As shown in FIG. 5, the rotary drive unit 43 includes a drive motor 46, a reduction device 48, and a pair of hooks 50. The reduction device 48 includes a rotary output device 49 on the outermost circumference of the rotary drive unit 43 to serve as an output device, and is coupled to the drive motor 46. The hooks 50 are located at 180-degree opposed positions on the rotary output device 49.

The reduction device 48 is located on a securing member 47 of the lower support member 23, which is mounted to the bed 16. The drive motor 46 is covered by a cover 45. The cover 45 is fixed by an upper support member, not shown, of the vertical machining center 10. As shown in FIG. 5, in this embodiment, the rotational center m of the pallet exchanger 40 is the axial center of the output axis of the drive motor 46. It is noted that the rotational center m is not necessarily limited to the axial center of the output axis of the drive motor 46. The rotational center may also be the axial center of a gear that constitutes a gear mechanism driven by the drive motor.

It is also noted that while an example of the hook 50 is an engagement claw, the engagement claw is not intended in a limiting sense. Other examples include an engagement pin.

As shown in FIGS. 3 and 5, when the pallet 60 in the machining area 12 is unclamped, the clamp plate 34 is lifted upward to push the pallet 60 upward and bring a pair of hooks 64, which is located on one side of the pallet 60, into engagement with the hook 50, enabling the pallet 60 to make a rotational movement. When the pallet 60 in the machining area 12 is clamped, the pallet 60 is lifted downward together with the clamp plate 34. This brings the hooks 64, which are located on one side of the pallet 60, out of engagement with the hook 50.

The guide mechanism 44 guides the pallet 60 when the pallet 60 is moved during pallet exchange. The guide mechanism 44 includes the guide members 54 and the rollers 65. The guide members 54 are mounted on a circular arc member 53, which is located on the outer circumference of the setup table 52. The rollers 65 are mounted on the respective guide members 54. As shown in FIG. 3, the center of the circular arc of the circular arc member 53 is the rotational center m of the pallet exchanger 40.

As shown in FIG. 3, the guide members 54, which constitute the guide mechanism 44, each have a rectangular plate shape. The guide members 54 are located on the circular arc member 53 in a radial manner relative to the rotational center m, and are fixed to respective mounting stands 55 at intervals as shown in FIG. 5. The mounting stands 55 are located on the circular arc member 53. The guide members 54 each have the same thickness as the thickness of the clamp plate 34, and are freely fitted in the engagement groove 62 of the pallet 60 around the rotational center m. The rollers 65 are rotatably supported on both ends in the longitudinal direction of the guide members 54. The rollers 65 roll on the ceiling surface of the engagement groove of the pallet 60. That is, the pallet 60 is rotatably supported on the upper portion of each of the rollers 65. Thus, the pallet 60 is also placed on the setup table 52, similarly to the case of the machining table 20. The height of the rollers 65 of the guide members 54 is set at the same height of the rollers 41 on the clamp plate 34 at the time when the pallet 60 in the machining area 12 is unclamped. As shown in FIGS. 2 and 3, the guide members 54 and the rollers 65, which constitute the guide mechanism 44, are kept off the cutout area 80.

It is noted that the guide mechanism 44 may be partially located in the cutout area 80 insofar as this does not interfere with the operator in entering the cutout area 80 when the openable-closable cover 90 is open.

Like the rollers 41 of the clamp plate 34, the rollers 65 of the guide members 54 are not necessarily cylindrical rollers; a spherical shape is also possible. It is also possible to use a sliding contact member.

Figure 6:
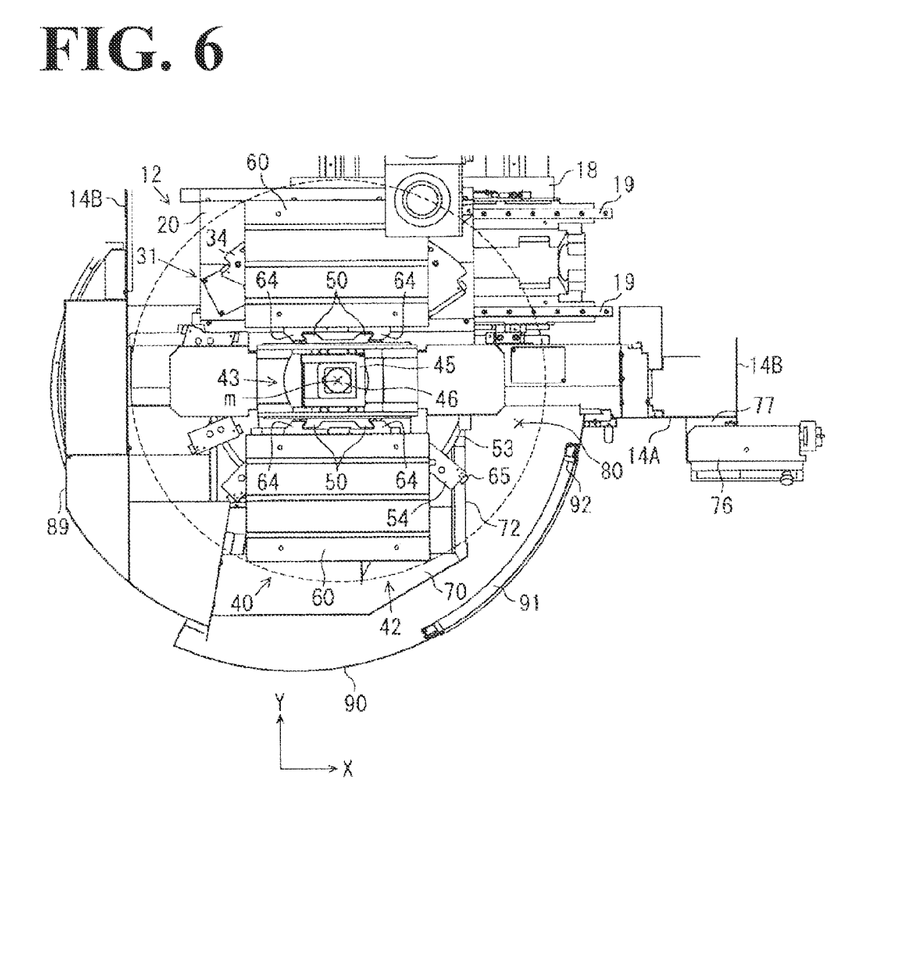
FIG. 6 is a plan view of the pallet exchanger with the openable-closable cover closed.

In the above-described configuration, by bringing both pallets 60 in the machining area 12 and the setup area 42 into 180-degree rotation by the drive motor 46 with the pallet 60 in the machining area 12 in unclamped state, the pallets 60 are able to be exchanged along a rotational track represented by the broken line shown in the machining area 12, the setup area 42, and the cutout area 80 in FIGS. 2, 3, and 6. The track is drawn by a corner of the pallet 60 that is farthest from the rotational center m. The area defined by the broken line is the pallet rotational movement area.

As shown in FIGS. 2 and 3, the cover wall 89 extends to the front of the vertical machining center 10 from the left splash guard 14B. The cover wall 89 is a left outer wall of the setup area 42. On the cover wall 89, the openable-closable cover 90 is supported in a manually operable manner to open and close the front and right sides of the setup area 42. FIG. 2 shows the openable-closable cover 90 in open state, while FIG. 6 shows the openable-closable cover 90 in closed state.

As shown in FIG. 2, when the openable-closable cover 90 is open, the operator can access the cutout area 80. As shown in FIG. 6, when the openable-closable cover 90 is closed, the cutout area 80 is closed by the openable-closable cover 90. When the openable-closable cover 90 is closed, the operator is not accessible to the inside of the cutout area 80, and the cutout area 80 serves as a part of the pallet rotation area of the pallet exchanger. Here, the openable-closable cover 90 assumes the function that the oil pan 70 lacks due to its cutout portion, that is, the function of collecting chips, cutting fluid, and other substances.

Figure 7:
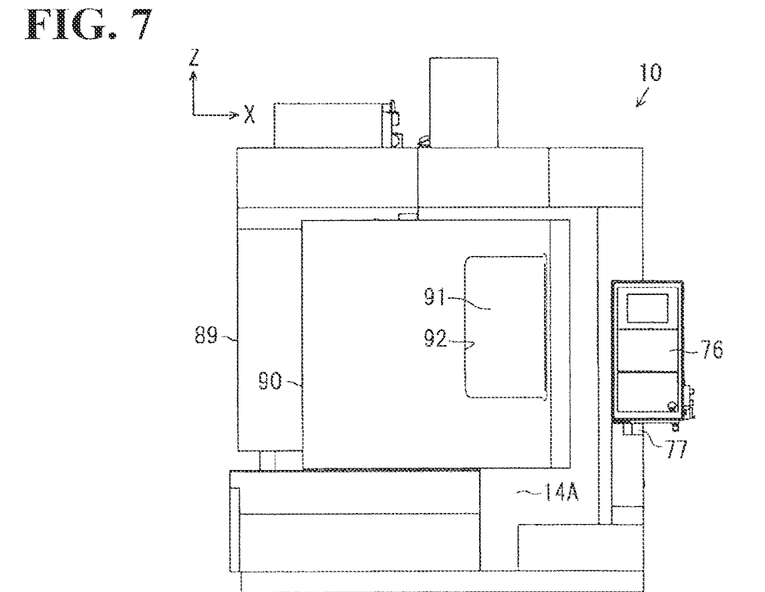
FIG. 7 is a front view of the vertical machining center with the openable-closable cover closed.

Also as shown in FIGS. 7 and 8, the openable-closable cover 90, on its closed end, is provided with a window 92, through which the setup area 42 is viewable. The window 92 is fitted with a transparent plate 91. Providing the window 92 ensures that when the openable-closable cover 90 is closed, the operator is able to see the setup area 42 through the window 92 and see the machining area 12 through the window 92 and the window 38 of the partition door 36, from outside the openable-closable cover 90.

As shown in FIG. 6, an operation panel 76 is located on the right end of the splash guard 14A, which is a front wall of the vertical machining center 10. The operation panel 76 is supported by a bracket 77 in a rotatable manner between a rotation position where the panel surface faces the cutout area 80 as shown in FIG. 2 and a rotation position where the panel surface faces forward as shown in FIG. 6. The position at which the operation panel 76 is located corresponds to a position adjacent the operator area including the cutout area 80. It is noted that the position at which the operation panel 76 is located will not be limited to the right end of the splash guard 14A, which is a front wall of the vertical machining center 10. Any other position is possible insofar as the position is adjacent the operator area including the cutout area 80. The operation panel 76 includes, on its panel surface, a monitor, operation keys, and other keys used to input into a controller, not shown, various operation commands for the vertical machining center 10.

2. Operation of the Embodiment

Next, operation and behavior of the vertical machining center 10 with the above-described configuration will be described.

In the machining area 12, as the machining table 20 moves in the X axis direction or the Y axis direction, the pallet 60 also moves in the same direction while being clamped on the machining table 20 by the clamp device 31 and carrying a workpiece, not shown. The workpiece on the machining table 20 in the machining area 12 undergoes cutting with a cutting tool, not shown, mounted on the spindle.

Here, it is assumed that an un-machined workpiece, not shown, is placed on the pallet 60 in the setup area 42. While the workpiece is undergoing cutting, the opening 30 is closed by the partition door 36 that is being at its closed position. In this case, the operator may enter the cutout area 80 with the openable-closable cover 90 in open state to see the machining area 12 through the window 38. Also as shown in FIG. 2, with the operation panel 76 being at the rotation position to face the cutout area 80, or with the operation panel 76 being at the rotation position to face forward, the operator may input from the operation panel 76 various operation commands into the controller, not shown.

Next, a case where pallet exchange is executed will be described.

During pallet exchange, the openable-closable cover 90 is closed as shown in FIG. 6, and thus the operator is prevented from entering the cutout area 80.

When pallet exchange is executed after the cutting of the workpiece has ended, the controller, not shown, moves the machining table 20 to the pallet exchange position shown in FIG. 2.

The controller, not shown, also gives an open command to the solenoid valve, not shown, to move the partition door 36 to the open position.

Then, after the movement of the machining table 20 to the pallet exchange position is complete, the controller, not shown, lifts upward the piston rod 33 of the clamp device 31 shown in FIG. 5, thereby releasing the pallet 60 fixed to the machining table 20 by the clamp plate 34. Specifically, the clamp device 31 unclamps the pallet 60 to cause the clamp plate 34 to push the pallet 60 upward and bring the hooks 64 of the pallet 60 into engagement with the hook 50 of the rotary drive unit 43 positioned at the machining area 12 side.

Then, the controller, not shown, confirms that the partition door 36 is open using a position detection switch, not shown, of the partition door 36. Then, the controller, not shown, drives the drive motor 46. Driving the drive motor 46 brings the pallets 60 in the machining area 12 and the setup area 42 into 180-degree rotation about the rotational center m. Examples of the direction of the rotation include the clockwise direction and the anti-clockwise direction.

After both pallets 60 have been brought into 180-degree rotation and exchanged, the controller, not shown, clamps the pallet 60 onto the machining table 20. Specifically, the piston rod 33 of the clamp device 31 shown in FIG. 5 is moved downward. This causes the pallet 60 in the machining area 12 to be moved downward and brings the hooks 64 out of engagement with the hook 50. Then, the pallet 60 is fixed to the machining table 20 by the clamp plate 34.

The controller, not shown, also gives a close command to the solenoid valve, not shown, to move the partition door 36 to the closed position.

Then, the controller, not shown, confirms that the partition door 36 is closed using the position detection switch, not shown, of the partition door 36. Then, the controller, not shown, moves the machining table 20 from the pallet exchange position to the vicinity of the spindle, and subjects the workpiece on the pallet 60 to cutting.

After the pallet exchange, the operator brings the openable-closable cover 90 into open state, and then enters the cutout area 80 to perform a setup operation such as exchanging the machined workpiece on the pallet 60 in the setup area 42 with an un-machined workpiece next to be treated.

The following are some of the features of the vertical machining center 10 with the above-described configuration.

The machining center 10 includes the partition door 36, which partitions the machining area 12 and the setup area 42 from one another in an openable and closable manner, and the openable-closable cover 90, which opens and closes the setup area 42. At one end of the oil pan 70, the cutout portion 72 is located. The area of space exposed to the cutout portion 72 serves as a part of the operator area, to which the operator is accessible, when the openable-closable cover 90 is open, that is, when the area is in open state. When the openable-closable cover 90 is closed, that is, when the area of space exposed to the cutout portion 72 is in closed state, the area serves as a part of the pallet rotation area of the pallet exchanger 40. This, as a result, prevents an increase in the machine width while ensuring the operator area in front of the machine and ensuring operations including handling the tool mounted on the spindle in the operator area.

This ensures use of the same place for the handling of the tool mounted on the spindle and the setup-exchange operation in the setup area. This, in turn, diminishes the movement range of the operator and improves work efficiency.

Also in the vertical machining center 10, the rotational center m of the pallet exchanger 40 is offset in the X axis direction from the axial center O of the spindle of the spindle head 28. The one end of the oil pan 70 at which the cutout portion 72 is located is closer in the X axis direction to the axial center of the spindle, that is, closer to the spindle base line n than the other end of the oil pan 70 is to the spindle base line n. Thus, in this embodiment, the rotational center of the pallet exchanger 40 is offset in the X axis direction from the axial center O of the spindle. This, as a result, shortens the distance between the cutout area and the spindle, and further facilitates operations including handling the tool mounted on the spindle in the operator area including the cutout area.

Also in the vertical machining center 10, the window 38 is located at least on the cutout area 80 side of the partition door 36. Through the window 38, the machining area 12 is viewable. This, as a result, enables the operator to observe the machining area 12 through the window 38 during automatic operation.

Also in the vertical machining center 10, the amount R of offset in the X axis direction from the axial center O of the spindle of the spindle head 28 to the rotational center m of the pallet exchanger 40 is equal to or less than half the width of the pallet. This configuration, as a result, prevents an increase in the machine width while ensuring that the pallet exchanger is located in front of the machine and ensuring the operator area including the cutout area 80.

Also in the vertical machining center 10, the pallet exchanger 40 includes the guide mechanism 44, which guides the pallet 60 during pallet exchange. The guide mechanism 44 is located at a position other than the cutout area 80. This, as a result, ensures that the cutout area serves as a part of the operator area even in a pallet exchanger provided with a guide mechanism.

Also in the vertical machining center 10, the operation panel 76 is located at a position adjacent the cutout area 80. The operation panel 76 is rotatable at least into a rotation position where the operation panel 76 faces the cutout area 80. This configuration, as a result, ensures that when the operator is adjacent the cutout area 80, the operator may position the operation panel 76 at the rotation position where the operation panel 76 faces the cutout area 80, thereby facilitating handling of the operation panel. That is, the operation panel can be oriented in a more suitable direction in accordance with whether the operation is intended for the machine itself or the setup area. This, as a result, ensures use of the same operation panel for the operations associated with the machine itself, pallet exchange, and setup and exchange, thus keeping the cost low.

In the embodiment, the rotational center m of the pallet exchanger 40 is offset to the left side from the axial center O of the spindle, and the cutout portion 72 of the oil pan 70 is located on the right end of the oil pan 70. The offset direction may be to the right side, which is opposite the left side. In this case, the cutout portion is located on the left end of the oil pan 70.

This embodiment eliminates or minimizes an increase in the machine width while ensuring an operator area including the cutout area in front of the machine and ensuring operations including handling the tool mounted on the spindle in the operator area.

The pallet exchanger may include a rotational center that is preferably offset in the X axis direction from an axial center of the spindle of the spindle head. Here, the cutout portion is located on the one end of the oil pan. The one end is at a side closer to the axial center of the spindle in the X axis direction, that is, a side closer to a line that is parallel to a Y axis and passes through the axial center of the spindle.

This configuration, in which the rotational center of the pallet exchanger is offset in the X axis direction from the axial center of the spindle, shortens the distance between the cutout area and the spindle, and further facilitates operations including handling the tool mounted on the spindle.

An amount of offset in the X axis direction from the axial center of the spindle of the spindle head to the rotational center of the pallet exchanger is preferably equal to or less than a width of the first pallet.

This configuration prevents an increase in the machine width while ensuring that the pallet exchanger is located in front of the machine and the cutout area serves as a part of the operator area.

The partition door preferably includes, at least on a side of the partition door at the cutout area, a window through which the machining area is viewable.

This configuration enables the operator to observe the machining area through the window during automatic operation.

The pallet exchanger preferably includes a guide mechanism at a position other than the cutout area to guide the first pallet and the second pallet when the pallet exchanger exchanges the first pallet and the second pallet.

This configuration ensures that the guide mechanism of the pallet exchanger is not located in the cutout area, and the cutout area serves as a part of the operator area.

An operation panel is preferably located adjacent the operator area, where the operator area includes the cutout area. The operation panel is configured to rotate at least into a rotation position where the operation panel faces the cutout area.

This configuration ensures that when the operator is in the cutout area, the operation panel is positioned at a rotation position where the operation panel faces the cutout area, and this facilitates handling of the operation panel for the operator in the cutout area.

Obviously, numerous modifications and variations of the present invention are possible in light of the above teachings. It is therefore to be understood that within the scope of the appended claims, the present invention may be practiced otherwise than as specifically described herein.

What is claimed is:

1. A machining center comprising:
an X axis direction, a Y axis direction, and a Z axis direction;
a machining table on which a first pallet is to be placed, the machining table being configured to move in the X axis direction;
a spindle head comprising a spindle on which a tool is to be mounted, the spindle head being configured to move in the Z axis direction relative to the machining table;
a splash guard covering a machining area of the machining center, in which machining area the tool mounted to the spindle machines a workpiece mounted on the first pallet placed on the machining table;
a rotary pallet exchanger configured to exchange the first pallet placed on the machining table with a second pallet placed in a setup area of the pallet exchanger, which setup area is outside of the splash guard and which setup area comprises an operator area;
a pallet rotational movement area in which the first pallet and the second pallet are to be rotated;
an oil pan below the second pallet placed in the setup area of the pallet exchanger, the oil pan accommodating at least a part of the pallet rotational movement area located outside the splash guard, the oil pan comprising a cutout portion on one end of the oil pan wherein an area of space exposed to and between the cutout portion and the splash guard forms a cutout area;

a partition door configured to open and close to partition the machining area and the setup area from one another; and an openable-closable cover configured to open and close the setup area and the operator area, wherein the pallet exchanger comprises a rotational center that is offset in the X axis direction from an axial center of the spindle of the spindle head, and the cutout portion is located at the one end of the oil pan, the one end of the oil pan being closer to a line that is parallel to a Y axis and that passes through the axial center of the spindle than another opposite end of the oil pan is to the line, and wherein the operator area is configured to allow an operator to stand therein to access the setup area when the openable-closable cover opens the setup area and the operator area, and is configured to be inaccessible to an operator and act as part of the pallet rotation area when the openable-closable cover closes the setup area and the operator area.

2. The machining center according to claim 1, wherein an amount of offset in the X axis direction from the axial center of the spindle of the spindle head to the rotational center of the pallet exchanger is equal to or less than a width of the first pallet.

3. The machining center according to claim 2, wherein the partition door comprises, at least on a side of the partition door at the cutout area, a window through which the machining area is viewable.

4. The machining center according to claim 3, wherein the pallet exchanger comprises a guide mechanism at a position other than the cutout area to guide the first pallet and the second pallet when the pallet exchanger exchanges the first pallet and the second pallet.

5. The machining center according to claim 4, further comprising an operation panel adjacent the operator area, where the operator area includes the cutout area, the operation panel being configured to rotate at least into a rotation position where the operation panel is accessible to an operator from the cutout area.

6. The machining center according to claim 3, further comprising an operation panel adjacent the operator area, where the operator area includes the cutout area, the operation panel being configured to rotate at least into a rotation position where the operation panel is accessible to an operator from the cutout area.

7. The machining center according to claim 2, wherein the pallet exchanger comprises a guide mechanism at a position other than the cutout area to guide the first pallet and the second pallet when the pallet exchanger exchanges the first pallet and the second pallet.

8. The machining center according to claim 7, further comprising an operation panel adjacent the operator area, where the operator area includes the cutout area, the operation panel being configured to rotate at least into a rotation position where the operation panel is accessible to an operator from the cutout area.

9. The machining center according to claim 2, further comprising an operation panel adjacent the operator area, where the operator area includes the cutout area, the operation panel being configured to rotate at least into a rotation position where the operation panel is accessible to an operator from the cutout area.

10. The machining center according to claim 1, wherein the partition door comprises, at least on a side of the partition door at the cutout area, a window through which the machining area is viewable.

11. The machining center according to claim 10, wherein the pallet exchanger comprises a guide mechanism at a position other than the cutout area to guide the first pallet and the second pallet when the pallet exchanger exchanges the first pallet and the second pallet.

12. The machining center according to claim 11, further comprising an operation panel adjacent the operator area, where the operator area includes the cutout area, the operation panel being configured to rotate at least into a rotation position where the operation panel is accessible to an operator from the cutout area.

13. The machining center according to claim 10, further comprising an operation panel adjacent the operator area, where the operator area includes the cutout area, the operation panel being configured to rotate at least into a rotation position where the operation panel is accessible to an operator from the cutout area.

14. The machining center according to claim 1, wherein the pallet exchanger comprises a guide mechanism at a position other than the cutout area to guide the first pallet and the second pallet when the pallet exchanger exchanges the first pallet and the second pallet.

15. The machining center according to claim 14, further comprising an operation panel adjacent the operator area, where the operator area includes the cutout area, the operation panel being configured to rotate at least into a rotation position where the operation panel is accessible to an operator from the cutout area.

16. The machining center according to claim 1, further comprising an operation panel adjacent the operator area, where the operator area includes the cutout area, the operation panel being configured to rotate at least into a rotation position where the operation panel is accessible to an operator from the cutout area.

* * * * *